United States Patent
Scharner et al.

(10) Patent No.: US 7,429,063 B2
(45) Date of Patent: Sep. 30, 2008

(54) COUNTERFEIT-PROOF METALLIC FOIL

(75) Inventors: Engelbert Scharner, Kilb (AT); Helmut Kloss, St. Georgen (AT); Adolf Schedl, Obergrafendorf (AT); Wilhelm Zuser, Hofstetten (AT); Lambert Nekula, Hofstetten (AT)

(73) Assignee: Teich Aktiengesellschaft, Weinburg (AT)

( * ) Notice: Subject to any disclaimer, the term of this patent is extended or adjusted under 35 U.S.C. 154(b) by 0 days.

(21) Appl. No.: 11/286,437

(22) Filed: Nov. 25, 2005

(65) Prior Publication Data

US 2006/0083905 A1 Apr. 20, 2006

Related U.S. Application Data

(63) Continuation of application No. 10/483,053, filed as application No. PCT/EP03/04524 on Apr. 30, 2003, now abandoned.

(30) Foreign Application Priority Data

Jun. 6, 2002 (AT) .................... A 866/2002

(51) Int. Cl.
*B42D 15/00* (2006.01)
(52) U.S. Cl. .................. 283/72; 283/83; 283/86; 283/109; 283/110; 428/195.1
(58) Field of Classification Search .............. 283/72, 283/83, 86, 109, 110; 428/195.1
See application file for complete search history.

(56) References Cited

U.S. PATENT DOCUMENTS

| 4,519,155 | A | * | 5/1985 | Gallagher et al. | 40/625 |
|---|---|---|---|---|---|
| 4,629,647 | A | | 12/1986 | Sander | |
| 4,632,430 | A | * | 12/1986 | Wicker | 283/97 |
| 4,662,653 | A | * | 5/1987 | Greenaway | 283/91 |
| 4,758,296 | A | | 7/1988 | McGrew | |
| 4,856,857 | A | | 8/1989 | Takeuchi et al. | |
| 5,007,271 | A | * | 4/1991 | Boegli | 72/196 |
| 5,310,222 | A | | 5/1994 | Chatwin et al. | |
| 5,388,862 | A | | 2/1995 | Edwards | |
| 5,492,370 | A | | 2/1996 | Chatwin et al. | |
| 5,582,103 | A | * | 12/1996 | Tanaka et al. | 101/32 |

(Continued)

FOREIGN PATENT DOCUMENTS

CN 1241664 1/2000

(Continued)

OTHER PUBLICATIONS

Embossing of Aluminium Foils; www.lkr.at.*

*Primary Examiner*—Cathy Lam
(74) *Attorney, Agent, or Firm*—Young & Thompson

(57) ABSTRACT

A counterfeit-proof metal foil is textured in at least a given partial area of its surface, this partial area having a radiation refraction value which is different compared to the remaining surface area. The metal foil is suitable as a packaging material, among others for medications. The manufacturer or the consumer can check based on the given surface structure which is intended as an identification sign whether he has acquired an uncounterfeited product. If texturing takes place on most of the surface of the metal foil, this is identical to the appearance of a printed picture so that the metal foil as claimed in the invention is likewise used as a decorative foil or an advertizing medium.

12 Claims, 2 Drawing Sheets

U.S. PATENT DOCUMENTS

Figures 1A, 1B:
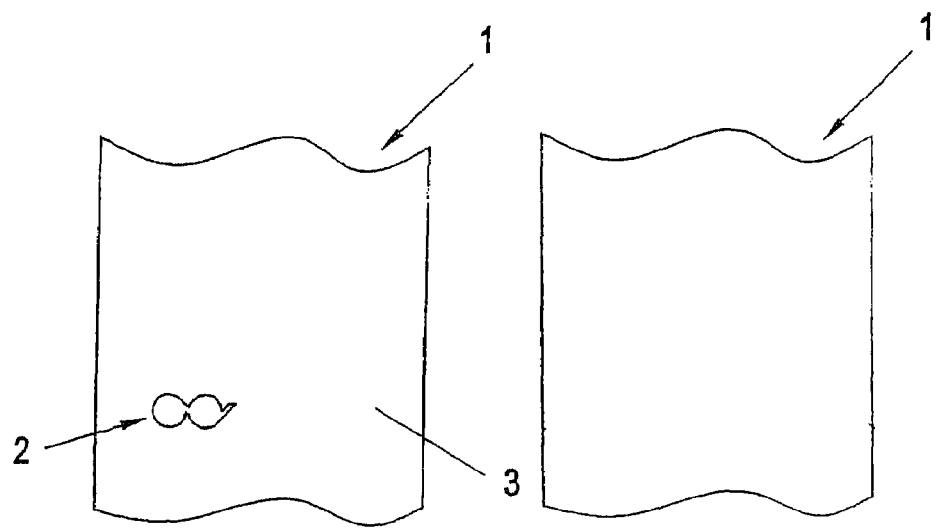

| | | |
|---|---|---|
| 6,153,316 A | 11/2000 | Shannon |
| 6,277,496 B1 | 8/2001 | Lohwasser et al. |
| 6,297,470 B1 | 10/2001 | Stelzl |
| 6,322,872 B1 | 11/2001 | Fuchs et al. |
| 6,389,216 B1 | 5/2002 | Bartenbach et al. |
| 6,490,403 B2 | 12/2002 | Bartenbach et al. |
| 6,494,491 B1 | 12/2002 | Zeiter et al. |
| 6,641,270 B2 | 11/2003 | Hannington et al. |
| 6,761,959 B1 | 7/2004 | Bonkowski et al. |
| 2002/0110350 A1 | 8/2002 | Bartenbach et al. |

FOREIGN PATENT DOCUMENTS

| | | |
|---|---|---|
| EP | 0 794 522 | 9/1997 |
| EP | 0 799 654 | 10/1997 |
| EP | 0 892 288 | 1/1999 |
| EP | 0 967 091 | 12/1999 |
| EP | 1 150 270 | 10/2001 |
| EP | 1 217 091 | 6/2002 |
| JP | 62-72440 | 4/1987 |
| JP | 11-224050 | 8/1999 |
| SU | 848393 | 7/1981 |
| WO | WO 01/11435 | 2/2001 |
| WO | WO 02/30661 | 4/2002 |

* cited by examiner

COUNTERFEIT-PROOF METALLIC FOIL

This application is a continuation of co-pending application Ser. No. 10/483,053, filed on Jun. 2, 2004. application Ser. No. 10/483,053 is the national phase of PCT International Application No. PCT/EP03/04524 filed on Apr. 30, 2003 under 35 U.S.C. § 371, which claims priority of Austrian Application No. A 866/2002 filed Jun. 6, 2002. The entire contents of each of the above-identified applications are hereby incorporated by reference.

The invention relates to a counterfeit-proof metal foil, a process for its production and its use for producing packaging material, decorative foils and advertizing media.

PRIOR ART

The demand for counterfeit-proof packaging material, for example for medications, has grown in recent years to the extent the amount of counterfeit medications has risen relatively greatly worldwide. These counterfeits can be pharmaceutically active drugs, but also agents with a placebo effect.

Therefore the attempt is made, as is known in banknotes, to provide packaging materials for the pharmaceutical industry with holograms. It has been found that even holograms, although their production is relatively complicated, can be counterfeited with increasing technical development. These counterfeits can only be characterized or recognized as such by a specialist since it is difficult for the user of a medication to ascertain whether the hologram is counterfeit or not if he does not have the corresponding comparison specimen.

Regardless of this, the attempt is made to produce counterfeit-proof packaging material in so far as the material surface is provided with a special coating which has pigments which can be activated by radiation. Thus, for example, the company logo of the manufacturer or the trademark of the medication can be made visible or invisible by radiation, such as UV or IR rays. EP-A2-1 217 091 relates to packaging with an integrated initial opening and/or originality guarantee which is produced by a coating which reflects incident light so that depending on the direction or angle of viewing different colors are discerned.

EP-A1-0 967 091 describes a coating of several grid images which are matched to one another and which, depending on the viewing angle, produce a different optical perception. But it has been found that these coating systems can also be added so that satisfactory counterfeit-proofness, especially with respect to packaging materials for the pharmaceutical industry, could not be achieved in this way.

DESCRIPTION OF THE INVENTION

The object of this invention is to avoid these known defects of allegedly counterfeit-proof metal foils.

This object is achieved as claimed in the invention using a metal foil which is characterized in that it is textured in at least a given partial area of its surface and that this partial area has light diffraction, scattering, refraction or reflection which differs compared to the remaining surface area. Further embodiments of the counterfeit-proof metal foil as claimed in the invention are disclosed according to the dependent claims.

The invention relates to a process for producing this counterfeit-proof metal foil, the textured partial areas being produced by means of laser technology.

The invention relates furthermore to a process for producing this counterfeit-proof metal foil, its being produced as claimed in the invention during a rolling process and at least one of the working rolls used having a surface which is textured in at least a given partial area, so that in the rolling process the structure of the roll surface is transferred to the metal foil. Other embodiments of this process as claimed in the invention are disclosed according to the dependent claims.

The invention relates furthermore to the use of the counterfeit-proof metal foil as claimed in the invention for producing packaging material, for example for medications, decorative foils and advertizing media.

DESCRIPTION OF THE INVENTION USING DRAWINGS AND EMBODIMENTS

The invention is detailed below using FIGS. 1 to 3.

Figure 2:
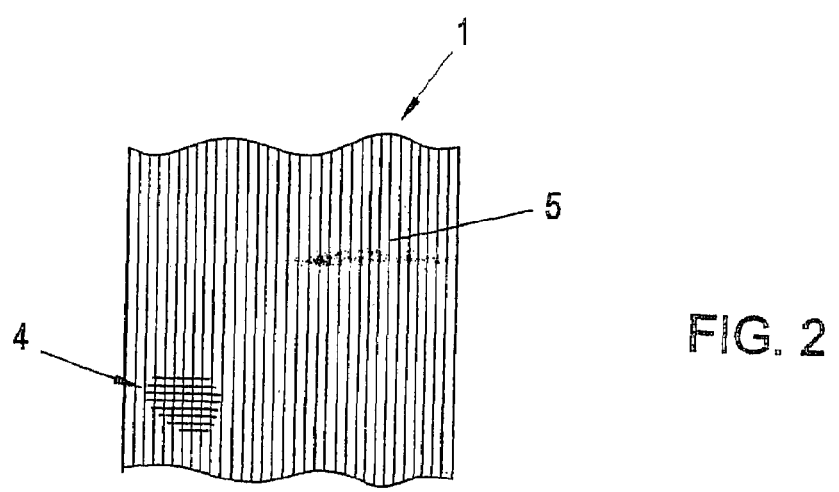
Figure 3:
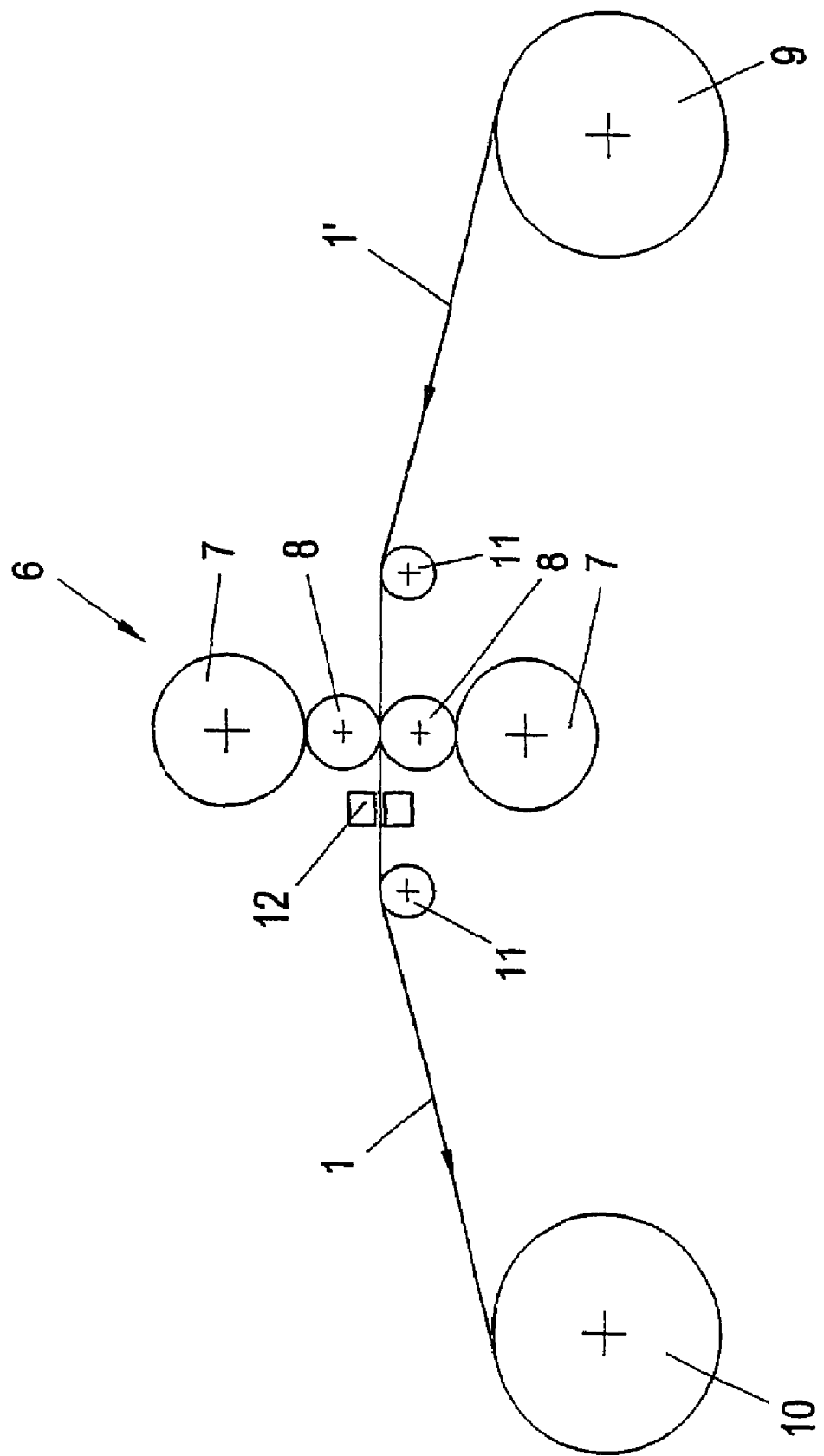

FIGS. 1A, 1B, and 2 show an extract from the counterfeit-proof metal foil 1 as claimed in the invention; and FIG. 3 shows a device in the form of a rolling mill 6 for producing the metal foil 1 as claimed in the invention.

One possible approach to implementing the invention is detailed below.

The starting product for producing the metal foil as claimed in the invention, for example, aluminum foil 1', is supplied to a rolling mill 6. It consists of backing rolls 7 and working rolls 8. The starting product in the form of a metal foil 1' is supplied to the roll gap between the working rolls 8 from a storage roll, specifically an uncoiling reel 9, via deflector rollers 11. The thickness of the foil used is reduced by the pressure of the working rollers which is used. Thus, for example, an aluminum foil 1' with an initial thickness of 40 microns can be reduced to 20 microns in one rolling process. The attained thickness of the foil is monitored at the measurement station 12, the foil 1 consequently being supplied to a winding reel, therefore another bearing roll 10. This rolling process can be repeated several times depending on the desired thickness.

In order to achieve the surface texturing as claimed in the invention, in the last rolling process the working roll pair is replaced by another working roll pair 8 which on its surface has texturing corresponding to one or more partial areas, as is to be achieved in the counterfeit-proof foil 1 as claimed in the invention. This texturing can be produced for example by grinding, polishing, etching, laser treatment or engraving of the surface of the working roll, laser technology proving especially preferable. Thus the texturing can be varied in a wide range so that on the one hand texturing visible to the viewer and on the other hand invisible texturing are produced.

Visible texturing of the roll surface produces likewise visible texturing on the surface of the metal foil, conversely the invisible texturing enables so-called hidden counterfeit-proof texturing. During the rolling process the indicated texturing is transferred using the required deformation pressure to the metal foil which thus as claimed in the invention has this texturing in at least one given partial area of its surface. The texturing can of course also extend to most of the roll surface so that not only counterfeit-proof, but at the same time a correspondingly decorated foil is produced.

Texturing can be regular, therefore with a geometrical arrangement, or random, for example rippled lines.

Depending on the application, the two surface sides of the metal foil can also be textured, for which the two working rolls 8 must be made accordingly with texturing.

Of course it is also possible to produce the textured surface areas on the counterfeit-proof metal foil 1 independently of the rolling process. Laser technology is suitable for this purpose, by which, depending on the extent of irradiation, both hidden surface texturing, i.e. not visible with the naked eye, and also surface texturing visible to the naked eye can be produced.

The invention is detailed using one embodiment of the metal foil 1 as claimed in the invention, as is described for example in FIGS. 1 to 2.

Here, as shown in FIG. 1A, surface texturing in the form of a planar identification sign 2, specifically a company logo, is reproduced. It differs in its radiation refraction value from the remaining foil surface 3 and is sometimes detectable to the viewer with the naked eye. If the company logo is one which is known to the viewer as the manufacturer for the packaging material, he has to have the certainty of obtaining an uncounterfeited product. An opposite surface of foil 1 is shown in FIG. 1B.

Depending on the surface texturing, the corresponding refraction or scattering of the incident light takes place. It can be measured for example using the reflection pattern which has formed. This measurability is especially important when the surface texturing cannot be detected with the naked eye.

Another identification sign is disclosed according to FIG. 2. Since the metal foils as claimed in the invention are preferably produced by a rolling process, by which, especially in the direction of running, the structure 5 of the roll surface, which structure is pointed lengthwise, is transferred to the surface of the metal foil 1, for example, by grinding the roll surface, texturing in the transverse direction to the direction of running can be produced such that a textured partial area 4 results on the metal foil 1 which causes a change in the light refraction. If the given texturing in the partial area 4 is compared to a pattern or to the roll surface, in case of agreement it can be precluded that it is a counterfeit product.

The pattern which has formed can be arranged regularly, but also randomly. Thus an irregularly arranged pattern is therefore associated with high counterfeit-proofness, since the texturing which has been formed using the random principle is known solely to the manufacturer. For test purposes, as is necessary in the packaging of medications, the manufacturer can check that the texturing on the surface of the packaging material is identical to that on the roll surface or on the corresponding patterns of the metal foil 1 using random samples of packaging material.

Furthermore, after producing the foil as claimed in the invention, the surface texturing can also be determined by a comparative optical measurement. This takes place for example with conventional light reflection measurement instruments.

The metal foils as claimed in the invention can be provided with a transparent coating after their surface texturing. Printing ink mixtures and plastic laminations which can optionally have pigments are suitable as transparent coatings. For example polyethylene terephthalate (PET), oriented polyamide (oPA) and laminations of oriented polypropylene (oPP) are suitable as plastic laminations.

These transparent coatings increase the decorative effect so that the metal foil as claimed in the invention is also used as a decorative foil or as advertizing media.

The identification sign in the form of surface texturing can however also be made invisible first by a covering enamel so that it is only made visible to a specialist upon further use. Using the comparison samples he checks whether it is an uncounterfeited product or not.

COMMERCIAL APPLICABILITY

The metal foils as claimed in the invention are used for producing packaging material, their being especially suited as packaging material for medications. In this use the manufacturer or the consumer can easily ascertain based on the given texturing in the foil surface that he has acquired an uncounterfeited product so that there is counterfeit-proofness based on the metal foil as claimed in the invention.

If texturing takes place on most of the surface of the metal foil, this is identical to the appearance of a printed picture so that the metal foil as claimed in the invention is likewise used as a decorative foil or an advertizing medium.

The invention claimed is:

1. A packaging foil for a product, the packaging foil comprising:
    a single layer of anti-counterfeiting metal foil that has an exposed first surface with a first non-textured area and a first textured area whose light diffraction, scattering, refraction or reflection is different from that of the first non-textured area, said first textured area being an identification sign,
    where the single layer of metal foil has a second surface opposite the first surface that has a second non-textured area opposite the first textured area, and
    where the single layer of metal foil alone without any additional layer exhibits anti-counterfeiting properties caused by said first textured area being an identification sign.

2. The foil of claim 1, wherein the first textured area is not visibly distinguishable from the first non-textured area with an unaided naked eye.

3. The foil of claim 1, wherein the foil comprises aluminum.

4. The foil of claim 1, wherein the first textured area has a linear structure.

5. The foil of claim 4, wherein the linear structure is arranged geometrically.

6. The foil of claim 4, wherein the linear structure is arranged randomly.

7. The foil of claim 1, further comprising a second textured area on the second surface of the foil opposite the first non-textured area.

8. The foil of claim 7, wherein the second textured area is not visibly distinguishable from the second non-textured area with an unaided naked eye.

9. The foil of claim 1, further comprising a transparent coating on the first surface over at least the first textured area.

10. The foil of claim 9, wherein the transparent coating contains at least one of printing ink and plastic.

11. The foil of claim 1, further comprising a coating on the first surface over at least the first textured area that renders the first textured area invisible to an unaided naked eye.

12. A packaging foil for a product, the packaging foil comprising:
    a single layer of anti-counterfeiting metal foil no more than 20 microns thick that has an exposed first surface with a first non-textured area and a first textured area whose light diffraction, scattering, refraction or reflection is different from that of the first non-textured area,
    wherein the single layer of metal foil has a second surface opposite the first surface that has a second non-textured area opposite the first textured area and a second textured area opposite the first non-textured area,
    wherein the single layer of metal foil alone exhibits anti-counterfeiting properties without any additional layer, and
    wherein the first textured area is not visibly distinguishable from the first non-textured area with an unaided naked eye.

* * * * *